J. O. MORRIS.
TOBACCO STEMMING MACHINE.
APPLICATION FILED MAR. 4, 1908. RENEWED MAY 10, 1910.
961,635.
Patented June 14, 1910.
4 SHEETS—SHEET 4.
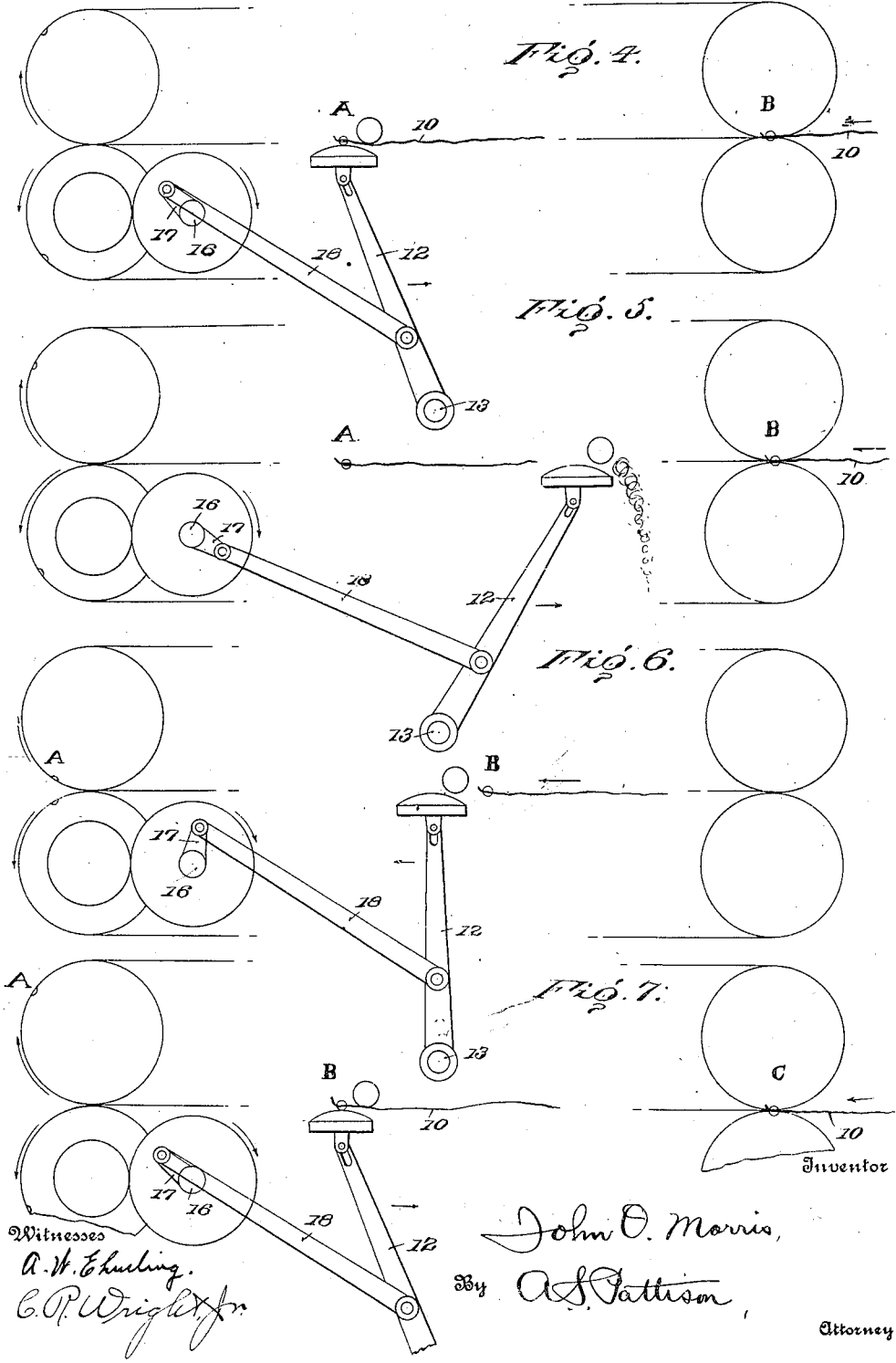

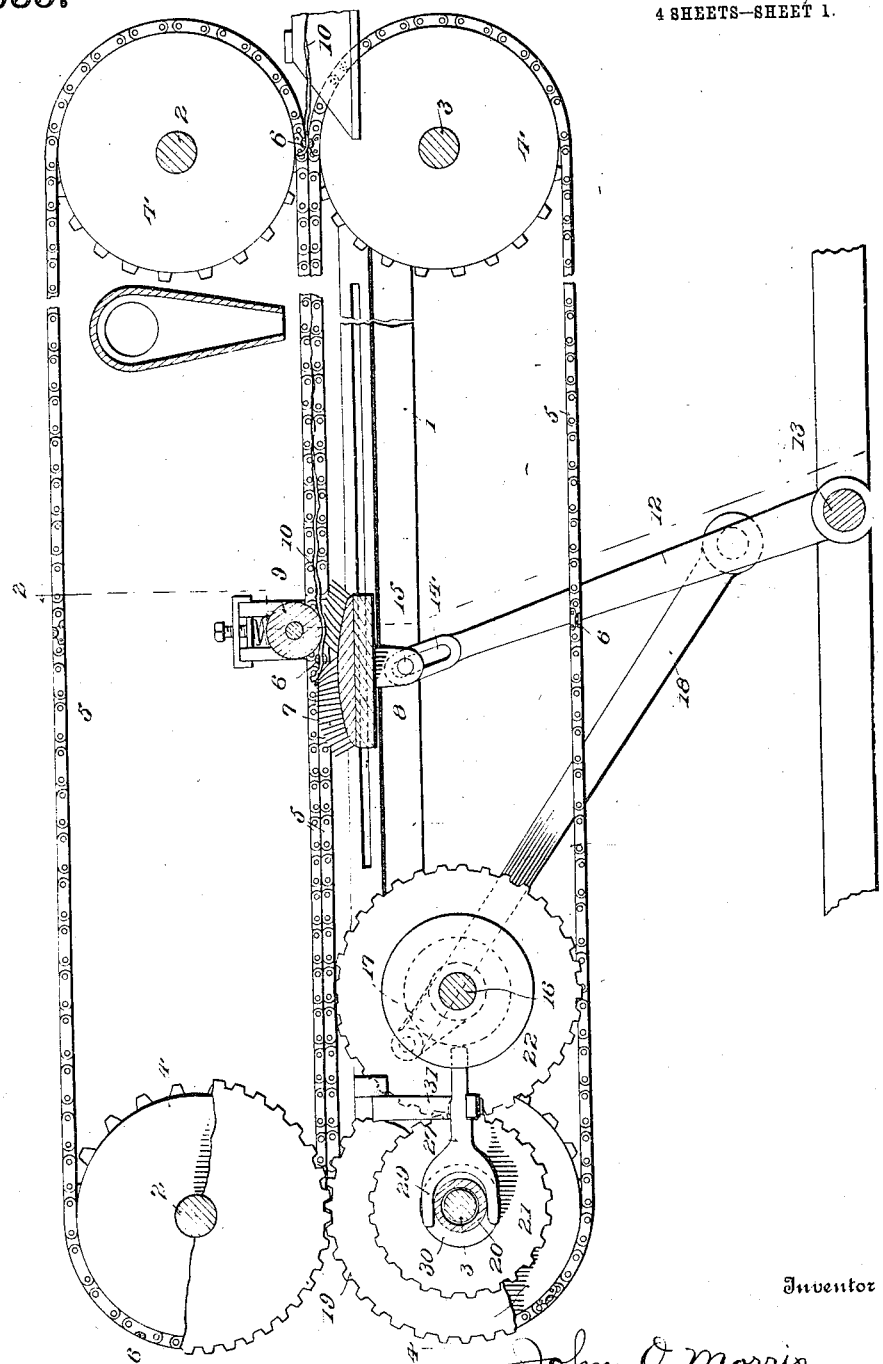

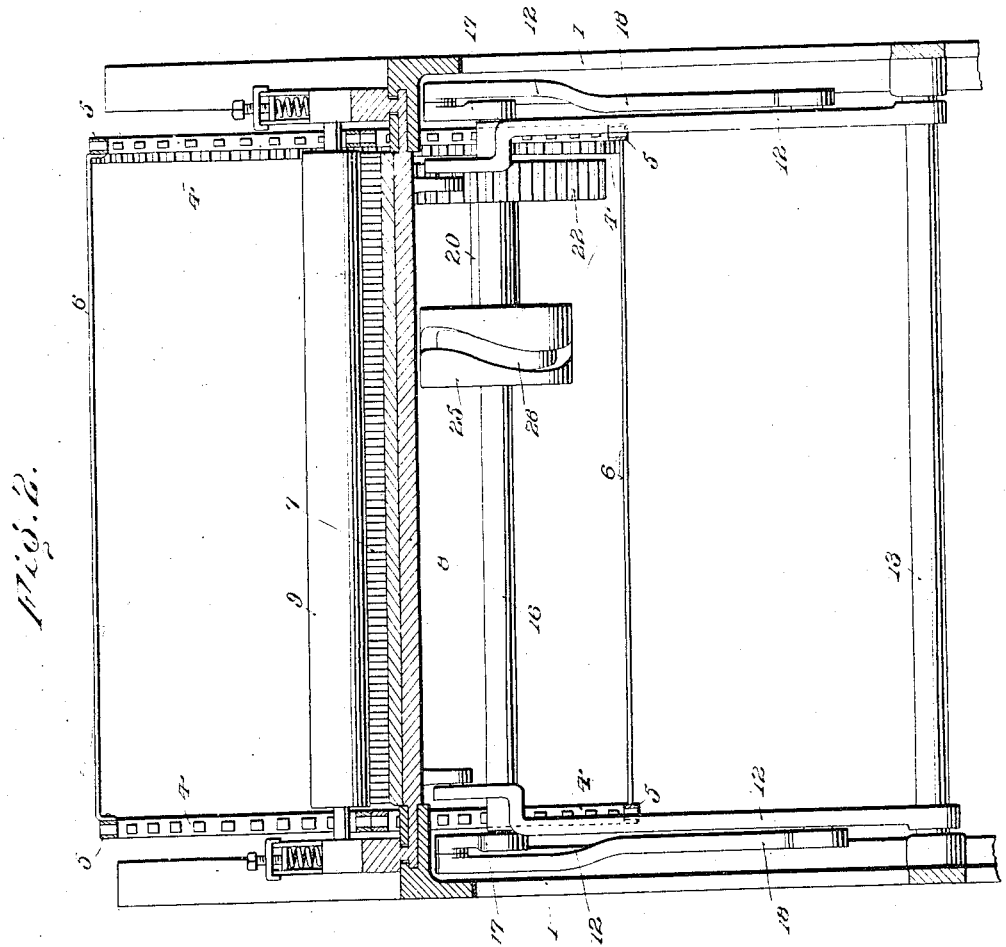

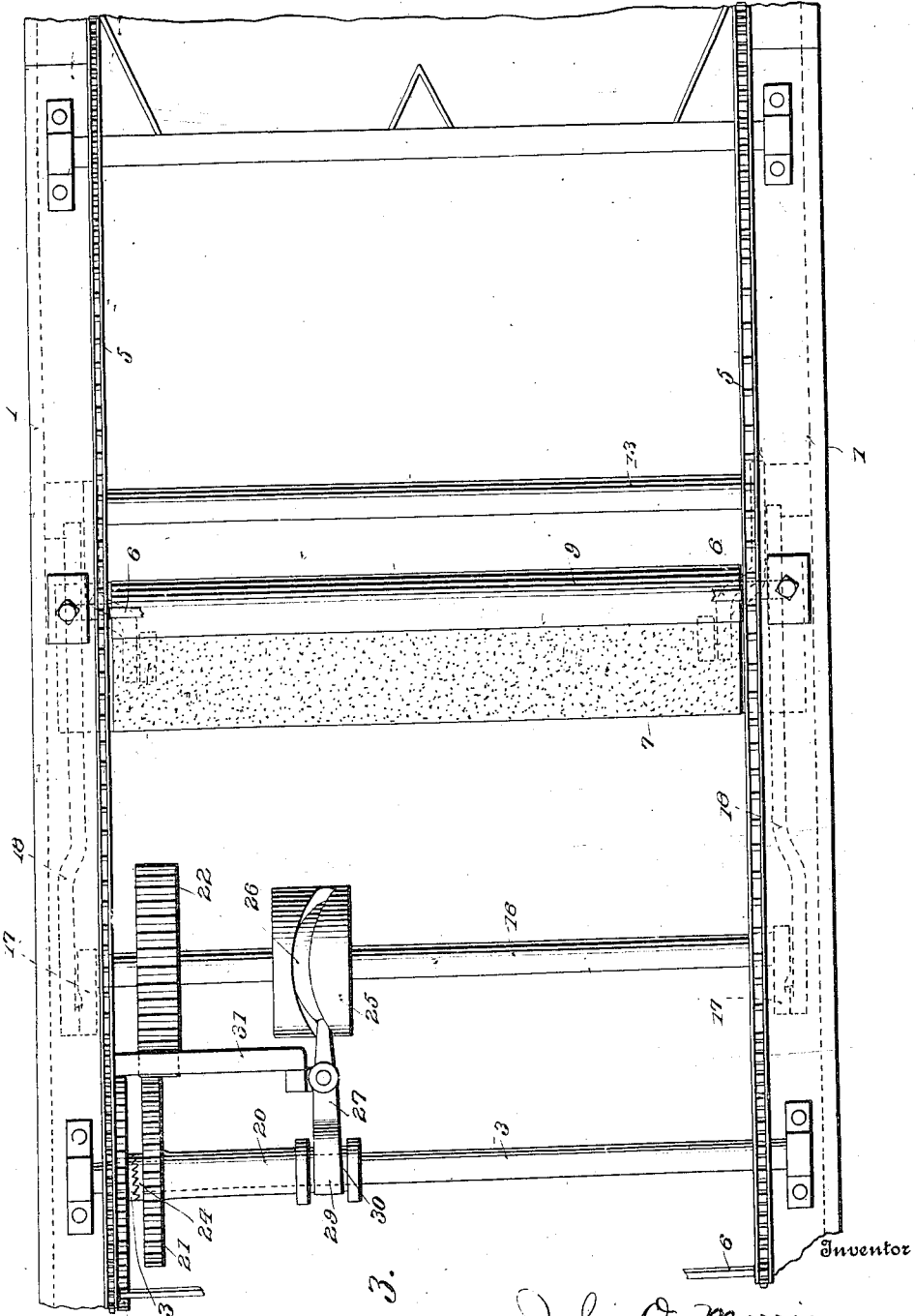

UNITED STATES PATENT OFFICE.

JOHN O. MORRIS, OF WASHINGTON, DISTRICT OF COLUMBIA.

TOBACCO-STEMMING MACHINE.

961,635.  Specification of Letters Patent.  Patented June 14, 1910.

Application filed March 4, 1908, Serial No. 419,213. Renewed May 10, 1910. Serial No. 560,465.

*To all whom it may concern:*

Be it known that I, JOHN O. MORRIS, a citizen of the United States, residing at Washington, in the District of Columbia, have invented certain new and useful Improvements in Tobacco-Stemming Machines, of which the following is a specification, reference being had therein to the accompanying drawing.

This invention relates to improvements in tobacco stemming machines, and pertains to that type of machine which is described and claimed in my co-pending application, Ser. No. 400,873.

The object of my present invention is to arrange and construct a different specific form from that shown in the said application for carrying out the broad invention therein disclosed and claimed. The mechanism shown in my said application is constructed to strip the leaf by carrying the leaf itself against a plurality of flexible stripping teeth, and to carry the leaf-stem through the teeth. In this application I show a mechanism adapted to cause the stripping teeth to travel against the leaf portions and past the stem, which is simply the reversal of the operation of the mechanism shown in my said application, so far as the relative movement of the stripping teeth and the leaf are concerned. The result in both mechanisms is the same, and so far as the result is concerned, it is immaterial whether the leaf and stem being stripped are caused to travel as in my said application, while the plurality of teeth remain quiet, or the leaf and stem be held quiet or stationary and the stripping teeth moved in respect to the leaf and the stem portions, in the manner herein disclosed. In either instance, it is essential that the stripping teeth should not have any material rotary stripping action, for, as stated in my said application, I have discovered that if the stripping teeth are given any material rotary stripping action the stripped leaf portions are substantially ground and are chewed up, whereas if the stripping is effected by mechanism in which the stripping teeth are devoid of any substantial or material rotary stripping action, the leaf portions are removed from the stem without injury, and the stem is entirely clean. The reasons for this, together with the principle of operation involved in the mechanism herein shown, is fully described in my aforesaid application, and if any fuller understanding thereof is desired, reference is here made to that application.

In the accompanying drawings, Figure 1, is a longitudinal, central, sectional view of my apparatus described and claimed herein. Fig. 2, is a vertical, transverse sectional view on the line 2—2 of Fig. 1. Fig. 3, is a top plan view. Fig. 4, is a diagrammatic view showing the positions of the stripping device and the leaf to be stripped, at the beginning of the stripping operation. Fig. 5, is a diagrammatic view showing the positions of the stripping device, the stem and the leaf portions, after the stripping operation, and the succeeding leaf gripped to be carried to its stripping position. Fig. 6, is a diagrammatic view showing that the succeeding leaf to be stripped has almost overtaken the stripping device in its return movement. Fig. 7, is a diagrammatic view showing that the succeeding leaf to be stripped has overtaken the stripping device when the leaf and the stripping device have reached their stripping positions.

In carrying out my present invention I provide a suitable frame 1 in which are journaled the two upper shafts 2 and the two lower shafts 3. These shafts are placed two of them above and two below the stripping path, and carry at each end the sprocket wheels 4, around which pass the four chains 5. Connected with these chains at suitable intervals are clutch devices 6 which are adapted to catch the butt end of the leaf to be stripped and carry it to the stripping position and to hold it there while the stripping operation is performed. These devices for convenience will be termed carrying devices.

The stripping device consists of a plurality of flexible stripping teeth 7 which project from a head or body 8 in a direction at right angles to, or substantially at right angles to the stripping path, and a co-acting member 9 between which the leaf 10 to be stripped is adapted to project as shown in Fig. 1. These two members may be aptly termed a stripping device, or they may be referred to in the plural as stripping devices. However, they move together as a unit when effecting the stripping operation. This stripping device extends across the machine, as shown in Figs. 2 and 3, which forms an elongated leaf-stripping surface, and the clutches or grippers 6 are likewise elongated, whereby the clutches are adapted to grip and carry a plurality of leaves to the stripping position, and the stripping device is adapted to simultaneously strip all the leaves conveyed and held by the carrier. The stripping device has a stripping movement longitudinal the leaf to be stripped, while the leaf is held stationary by the clutches 6. A plurality of clutches 6 are arranged on the carrier, and these clutches are adapted to first grip the butt end of the stems of the leaves; then carry them to the stripping position, and discharge the stripped stems, and these functions are performed by the clutches in succession.

A suitable mechanism is provided for intermittently imparting a stripping movement to the stripping device, and the mechanism here shown to do this will now be explained. Located at each side of the machine is a lever 12, and these levers have their lower ends arranged on stationary pivots 13. The upper ends of these levers are slidably connected with opposite ends of the head 8, by a slot 14, and pin 15. A driving or power shaft 16 extends transverse the machine, and has at its ends the cranks 17 to which one end of the links 18 are connected, and the opposite ends of these links are connected with the levers 12 intermediate their ends. As the shaft 16 revolves the stripping device is moved back and forth, and the movement of the stripping device in one direction is its stripping movement, while its movement in the opposite direction is its return movement.

While the stripping device is effecting its stripping movement, the clutches 6 for holding the leaves, are stationary, or substantially so, but the clutches move as the stripping device returns, and in the same direction as, but faster than the return movement of the stripping device, and will overtake the stripping device by the time it reaches its return movement to again begin its stripping action. I will now explain the mechanism here shown for accomplishing this.

The shafts 2 and 3 which are located adjacent the drive shaft 16, are geared together by the gears 19, so that when the shaft 3 is rotated, the shaft 2 is rotated in unison therewith, and the chains 5 and clutches 6 are caused to travel in unison. A sleeve 20 is loose upon the shaft 3, and this sleeve carries a gear 21 which is constantly in mesh with the gear 22 of the driving shaft 16. Firmly connected with the shaft 2 is one member 23 of a clutch, and a co-acting clutch member 24 is carried by the geared-sleeve 20. When the two members of the clutch are brought together, as shown in Fig. 3, the shaft 3 is caused to revolve, and as a consequence the chains 5 and clutches 6 are moved.

A cam 25 is carried by the shaft 16 and this cam has a groove 26 in which one end of an intermediately-pivoted clutch-lever 27 engages, while the opposite end of the lever engages a yoke 29 in engagement with a groove 30 formed in the sleeve 20. The clutch-lever 27 is supported by a suitable bracket 31. By this construction, the leaf-carrier is caused to move and to stand still once for every revolution of the shaft 16, and the groove is so arranged and shaped that the carrier remains quiet while the stripping device has its stripping movement, and to travel during the return movement of the stripping device, but at a greater rate of speed.

In Figs. 4 to 7 inclusive, I have shown diagrammatically the movements and relative positions of the stripping device and the clutches. Fig. 4 shows their position at the beginning of the stripping movement; Fig. 5 their relative positions at the end of the stripping movement; Fig. 6 shows that the clutch carrying the unstripped leaves to their stripping position has gained on the stripping device during its return movement, and Fig. 7 shows the clutch B as overtaking the stripping device and holding the unstripped leaves in position for the succeeding stripping movement of the stripping device.

A suitable air blast delivering tube or member 32 is located at the end of the stripping movement to blow the stripping leaf out of the leaf-delivering and stripping path before the succeeding carrier-clutches reach that point.

Having thus described my invention, what I claim and desire to secure by Letters Patent, is:—

1. A tobacco stemmer comprising a movable stripping device, and a leaf holder held against movement in any direction during the stripping movement of the stripping device.

2. A tobacco stemmer comprising a leaf holder held against movement in any direction for leaf stripping purposes a movable stripping device, and means for imparting a stripping movement to the stripping device while the leaf holder is held against movement.

3. A tobacco stemmer comprising a leaf holder adapted to hold the leaf stationary for stripping purposes, and a stripping device composed of a plurality of closely-disposed flexible teeth movable in a direction longitudinal the leaf to be stripped.

4. A tobacco stemmer comprising a leaf holder adapted to hold the leaf stationary for stripping purposes, and a stripping device composed of a plurality of closely-arranged flexible teeth movable only in a direction longitudinal the leaf to be stripped during the stripping operation.

5. A tobacco stemmer comprising an intermittently-movable leaf carrier, and a stripping device having a stripping movement while the carrier is quiet.

6. A tobacco stemmer comprising an intermittently-movable leaf carrier, and a stripping device having an intermittent stripping movement in a direction opposite to the movement of the carrier.

7. A tobacco stemmer comprising a leaf carrier intermittently-movable in one direction, and a stripping device having a stripping movement while the carrier is quiet, and a return movement while the carrier is moving.

8. A tobacco stemmer comprising a leaf carrier intermittently movable in one direction, and a stripping device having a stripping movement while the carrier is quiet, and a return movement in the same direction as the carrier but slower than the movement of the carrier.

9. A tobacco stripping device comprising a plurality of closely-arranged teeth, and a co-acting toothless member between which the leaf stem passes while being stripped.

10. A tobacco stripping device comprising a plurality of closely arranged teeth, and a co-acting toothless member in direct engagement with said teeth between which the leaf stem passes while being stripped.

11. A tobacco stripping device comprising a plurality of closely arranged teeth, and a co-acting toothless member adapted to press the tobacco leaf stem against the teeth.

In testimony whereof I affix my signature in presence of two witnesses.

JOHN O. MORRIS

Witnesses:
  A. S. PATTISON,
  JOHN L. FLETCHER.